Feb. 5, 1929.
P. ESCALLIER
1,701,034
COMPASS FOR AIRCRAFT
Filed Dec. 9, 1925   2 Sheets-Sheet 1
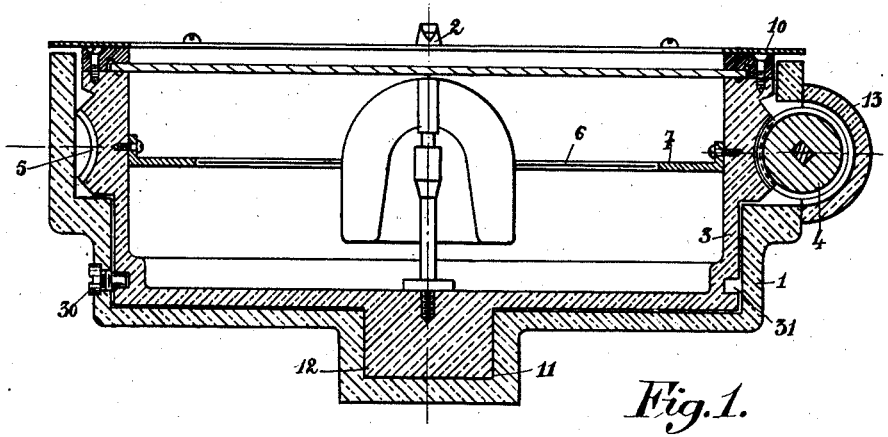
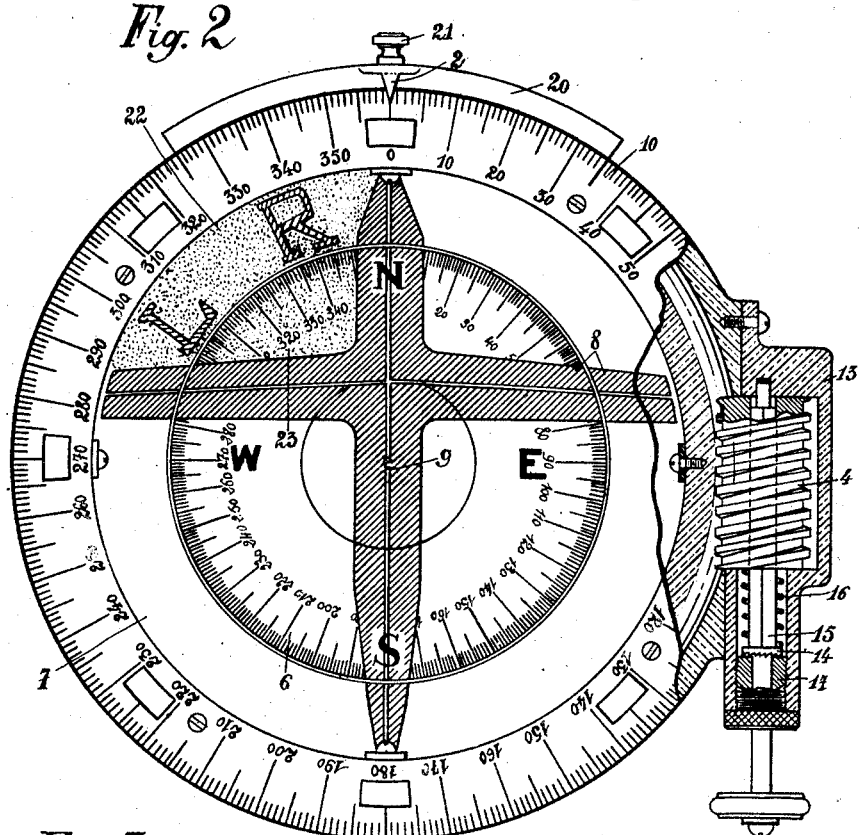
Inventor:
Pierre Escallier
By William C. Linton
attorney.

Feb. 5, 1929.  1,701,034
P. ESCALLIER
COMPASS FOR AIRCRAFT
Filed Dec. 9, 1925   2 Sheets-Sheet 2
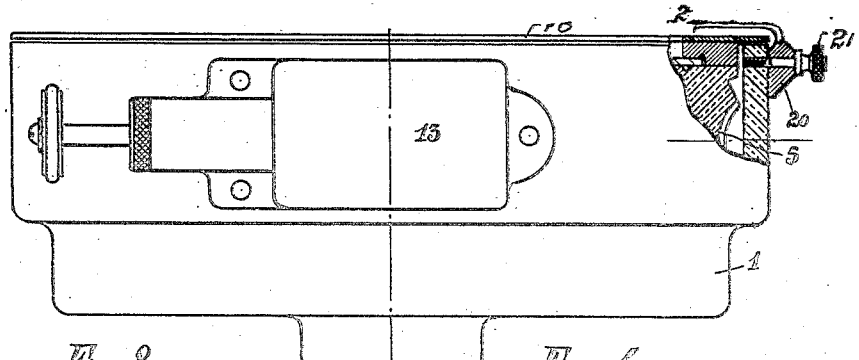
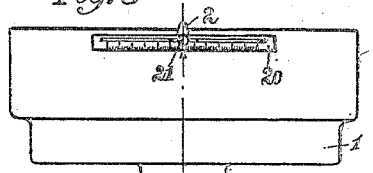
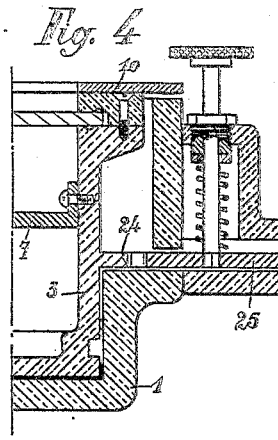
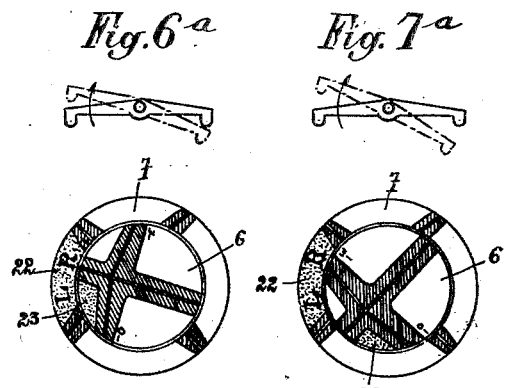
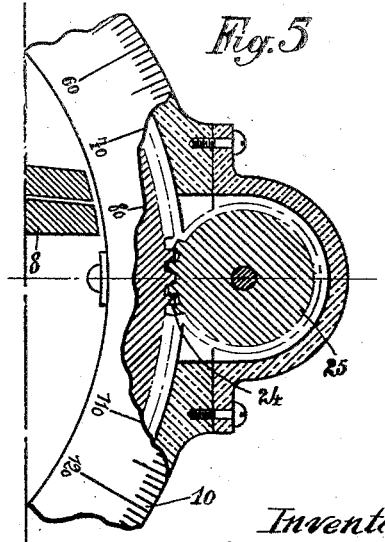
Inventor
Pierre Escallier
By William C. Linton
Attorney Patented Feb. 5, 1929.

1,701,034

UNITED STATES PATENT OFFICE.

PIERRE ESCALLIER, OF LYON, FRANCE.

COMPASS FOR AIRCRAFT.

Application filed December 9, 1925, Serial No. 74,323, and in France December 18, 1924.

Errors of direction, very often the cause of the loss of many aircraft forced to land after unsuccessfully trying to identify the region over which they are flying, are caused almost always by errors in the readings of the compass.

This invention relates to an apparatus that eliminates the reading of the angle of direction, to avoid said errors associated with this reading, and enables the pilot in charge of the airplane control to spend but little time with the compass.

The instrument consists essentially in adding inside the compass cup or bowl, a crown of a certain width and placed at the level of the compass card.

On the card is partly drawn in black, schematically, an airplane with the wing tips and tail drawn on the crown.

The cup or bowl is movable around a vertical axis and so can revolve around the card with the crown attached to it. The card now bears no graduation but only the schematic drawing of the airplane and also indications N. S. E. W.

The movable cup or bowl has attached to its upper part a scale graduated from left to right.

Finally, the guide line is outside and is supported by the pan or frame into which the movable cup or bowl revolves.

Although the drawing chosen is of an airplane it could be replaced by any other figure, but experience has proved that such a drawing is perfectly suited because the shape of an airplane gives four natural points impossible to confuse among themselves; furthermore said airplane is directed to a point that is north, a most excellent base of orientation.

The following description with appended drawing as an example will clearly and fully illustrate the way this invention is realized.

Figure 1 represents a vertical section of a compass according to the invention;

Figure 1ª is an elevation, partly in section;

Figure 2 is a top or plan view;

Figure 3 is a detail elevation showing how the index representing the guide line is attached to the frame;

Figures 4 and 5 represent respectively a cross section view and top view of a modified construction;

Figures 6, 6ª, 7 and 7ª are diagrams to explain the working of compass;

Figures 8 and 9 show attachment of lubber's line.

As seen in Figures 1, 1ª and 2 an outside bowl 1 serves as a frame and carries the guide line 2 and driving mechanism of movable bowl 3. This movement is attained by a worm 4 driving a gear 5 attached to inside bowl 3, or by any other means.

The inside bowl 3 is very nearly the same as those used at present. A small screw 30 in bowl 1 engages in a circular notch 31 in the cup or bowl 3 to prevent said bowl 3 from coming out.

Inside the bowl 3 and level with the compass card 6 is a crown 7 securely attached thereto. The crown may be omitted at places where there is no marking.

Finally, on the compass card and crown, a black airplane 8 is drawn so that the wing tips, nose and tail are on the crown. This airplane is seen complete only when the graduations on the border placed in front of the guide line correspond to the aircraft's course; in any other position, the wings, tail and nose are disaligned from the body portion.

On the black surface of said airplane, luminous lines 9 (for night flying) are placed to permit of an exact adjustment of the figure. On the upper part of movable cup 3 is placed a border graduated clockwise from 0° to 360° or from 0 to 400 grades or in quadrants. This border bears small rectangles for the inscription of residual deviations.

The outside bowl 1 constitutes, strictly speaking, the frame of said movable cup or bowl 3. It is composed of (a) In the lower part, a depression 11 which receives a journal 12 on the movable cup.

(b) On the wall, an opening used to admit the worm 4 which for mechanical reasons is supported by a small, separate frame 13.

(c) The guide line 2 which by special means described below can be adjusted very accurately.

(d) Means of attaching compass to aircraft (not shown).

The worm 4 is automatically locked in any position. Whatever vibrations may be applied to the movable bowl, the position cannot vary on account of the one-way movement of the system and locking of worm by means of a ratchet 14 conveniently placed at 15 on the worm shaft and pressed against a stop 17 by means of a spring 16.

The guide line is constituted by an index 2. Its base 20 bears graduations from minus 30 to plus 30 degrees, permitting an exact adjustment of said guide line and correction of declination as explained further in the text.

Two headless screws 18 and 19 sliding in a slot in the base 20 guide said base when moved for adjustment purposes.

A locking screw 21 is used for locking purposes when the adjustment is completed.

The aircraft 8 is drawn on the card in such a way that when the line 0—180° of the border is oriented at the letters N and S of the crown, said aircraft is seen complete, all the parts of the crown being then in proper relation. It is to be remarked that when the plane is seen complete, the course is exactly N S but the wings do not indicate W E; they are purposely set upwardly from the center to prevent the possibility of erroneous flying which might easily happen if said aircraft were shaped as a perfect cross.

The spaces 22 and 23 on the crown 7 and card 6 respectively between the northward and westward parts of the plane are colored, red for example, and in the space 22 two letters are placed that can be read in both directons; R on the north side and L on the west side. These will be explained later.

Aside from the schematic drawing, the letters N S W E may be added on the compass card, although they may be dispensed with. The only precaution to take is that the line 0—180° of the border coincides with the line N S, i. e., along the longitudinal axis of the aircraft body drawn on the crown.

Figures 4 and 5 show a modified construction. Bowl 3 is movable by means of gear 24 and pinion 25 with locking means similar to that already described for the worm.

The remainder of the compass is similar to Figures 1 and 2.

The operation and use of the compass are as follows:

The pilot finds his course on the map. He then makes the necessary modifications. He adds or subtracts the drift if necessary. Having the angle of direction on the compass, the pilot turns the knurled head attached to worm 4 to move the border 10 until the number thereon corresponding to said angle is opposite the guide line 2; this is the only important operation needed to operate the compass.

The airship, in flight, will be on the right course only when all the parts of the drawing (card, crown) are in true relation to each other. This relation is instantly visible without reading and is easy to maintain. The pilot can keep his course without strain and without having to consult the compass constantly. A glance from time to time will enable him to see if he is flying along the course already set.

If the pilot has already set his compass and besides if he has noted on the border the residual deviations in the rectangular spaces provided for this purpose, the calculations will be greatly simplified. All he needs to do is to find on the map the angle of the true course, modify said course according to the drift correction, then read opposite the corresponding figure on the border, and finally to bring the guide line and said figure together.

The red areas 22 and 23 between letters N and W further facilitate this reconstruction of the drawing especially at the start when the unsymmetry is greatest.

Furthermore, the two letters R (right) and L (left) on the crown show which foot to use to re-establish the correct adjustment.

The two diagrams, Figures 6, 6ª, 7 and 7ª, show clearly the way to use these letters.

In Figure 6 the pilot deviates from his course to the right. He reads on the crown the letter L opposite red area 23 on the card, presses the left foot-control, as in Figure 6ª, and re-establishes his course. If the angular deviation is great (Figure 7) he will see that to return to the red area 23 of the card, the smallest arc to be travelled is the one nearer letter L. He will then press the left foot control to maintain the adjustment.

He would have operated inversely had the smaller arc been that of letter R.

In short no matter in what position the crown lies, that is, the ratio of the flying craft to the compass card 6, one must always depress the foot-control of the side shown by the letter reached by the smallest arc.

If on the way the pilot finds that the wind has changed and is causing drift, his angle of direction can be modified by turning the knurled head of the worm.

In short the instrument has the following characteristics:

(1) Eliminates the reading of the angle of course, at a glance, even on dull days the pilot can ascertain whether he is flying to the course already set at the start.

(2) The wings, nose and tail of the schematic airplane form four marks impossible to confuse because outside their true relation they cannot be exactly assembled. So, whatever the pilot's position is, he will at least see two marks that will enable him to follow his set course.

(3) Graduations being on the border, the same compass may at the will of the operator be divided in degrees, grades or quadrants, etc., simply by changing said border.

Incidentally, the invention allows to make, while flying, all necessary corrections.

To set the guide line, one proceeds exactly as with an ordinary compass. If its position differs by say three degrees then graduation 3 of said guide line is placed opposite the mark on the bowl and thus its exact position will be determined. All that need be done now is to tighten it by means of the screw provided for this purpose and to proceed by the usual methods to the compensation proper of the compass.

The correction for declination is effected by moving the guide line one way or the other, according to the sign of the value of declination for the place considered; as for fixing guide line, either the border or bowl graduations are used for this operation.

Having thus fully described the invention, what I claim as new and desire to protect by Letters Patent is:

1. A device for eliminating reading the angle of direction in navigation by compass, particularly for aircraft, comprising a rotatably mounted graduated bowl, an annular crown fixed inside said bowl, a compass card mounted within said crown, and a representation of the body of an airplane depicted on said card and having its corresponding nose, wing tips and tail positioned on said crown, whereby the parts of said representation are in alinement when the aircraft is on the proper course.

2. A device according to claim 1 further characterized by a fixed frame supporting said bowl, a graduated guide device carried by said frame, and means for setting the graduations on the bowl with respect to said guide device.

3. A device according to claim 1, further characterized by a fixed frame supporting said bowl, a graduated guide device carried by said frame, said device comprising a graduated plate slidable longitudinally on the frame and having an index co-operating with the graduations of the bowl, an index member fixed to said frame opposite the graduations of the guide device, means for clamping said guide device in any position opposite the index member of the frame, and means for setting the graduations on said bowl with respect to the index of said graduated plate.

4. A device for eliminating reading the angle of direction in navigation by compass, particularly for aircraft, comprising a rotatably mounted graduated bowl, an annular crown fixed inside said bowl, a compass card mounted within said crown, a representation of the body of an airplane depicted on said card and having its corresponding nose, wing tips and tail on said crown, whereby the parts of said representation are in alinement only when the aircraft is on the proper course, the sectors of the crown and compass card determined by one of the angles of said representation being brightly colored, the colored part of the crown bearing the letters R and L, as an indicator in re-establishing the course of the aircraft.

In witness whereof I have signed this specification.

PIERRE ESCALLIER.